No. 698,950. Patented Apr. 29, 1902.
N. N. HILL.
BICYCLE BELL.
(Application filed Dec. 12, 1901.)
(No Model.) 2 Sheets—Sheet 1.
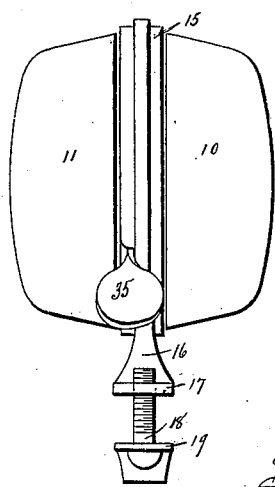
Fig. 1
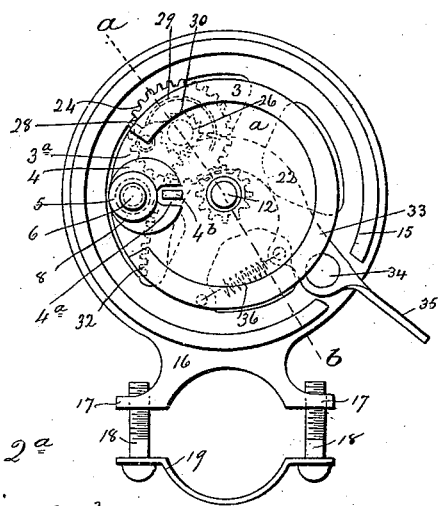
Fig. 2
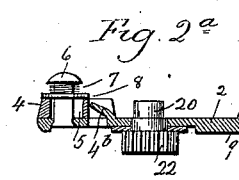
Fig. 2ª
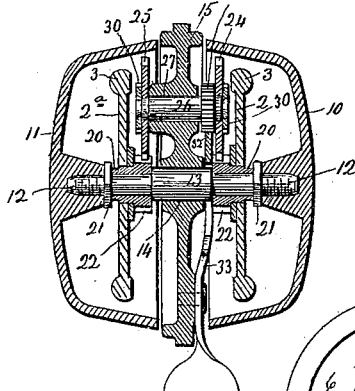
Fig. 3
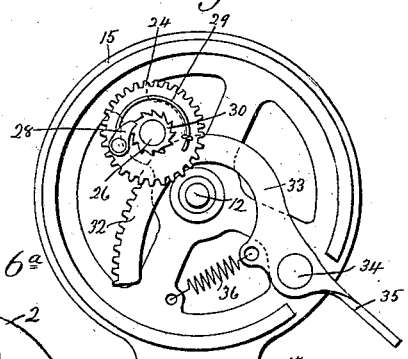
Fig. 4
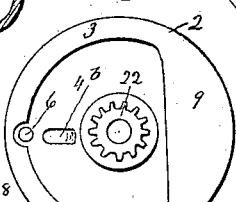
Fig. 6ª
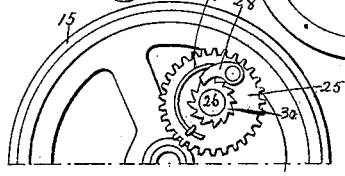
Fig. 5
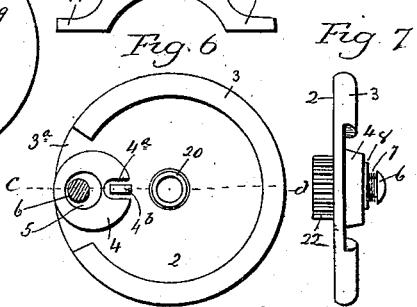
Fig. 6   Fig. 7
Witnesses:
J. H. Shumway
C. L. Weed
Norman N. Hill — Inventor
By Attys Seymour & Earle
THE NORRIS PETERS CO., PHOTO-LITHO., WASHINGTON, D. C.

No. 698,950. Patented Apr. 29, 1902.
N. N. HILL.
BICYCLE BELL.
(Application filed Dec. 12, 1901.)

(No Model.) 2 Sheets—Sheet 2.

UNITED STATES PATENT OFFICE.

NORMAN N. HILL, OF EAST HAMPTON, CONNECTICUT.

BICYCLE-BELL.

SPECIFICATION forming part of Letters Patent No. 698,950, dated April 29, 1902.

Application filed December 12, 1901. Serial No. 85,600. (No model.)

*To all whom it may concern:*

Be it known that I, NORMAN NEWTON HILL, of East Hampton, in the county of Middlesex and State of Connecticut, have invented a new and useful Improvement in Bicycle-Bells; and I do hereby declare the following, when taken in connection with the accompanying drawings and the figures of reference marked thereon, to be a full, clear, and exact description of the same, and which said drawings constitute part of this specification, and represent, in—

Figure 8:
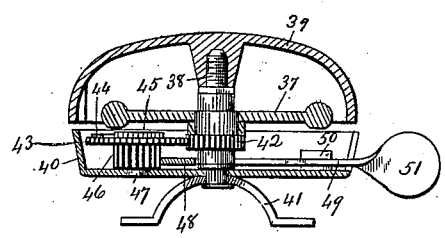
Figure 9:
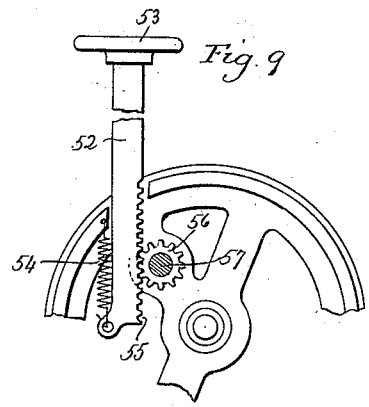

Figure 1, a view in front elevation of a double bicycle-bell constructed in accordance with my invention; Fig. 2, a view in side elevation with one of the gongs removed; Fig. 2$^a$, a sectional view of one of the loose balance-wheels on the line $c\,d$ of Fig. 6; Fig. 3, a view of the bell in cross-section on the line $a\,b$ of Fig. 2; Fig. 4, a detached view, in side elevation, of the frame of the bell, showing also the operating-lever and the right-hand loose gear-wheel, together with its pawl and the ratchet-wheel with which the same coacts; Fig. 5, a less comprehensive reverse view, showing the upper half of the frame and the left-hand gear-wheel with its pawl and ratchet-wheel; Fig. 6, a detached view, in side elevation, of one of the loose balance-wheels, together with its vibrating striker; Fig. 6$^a$, a reverse view thereof; Fig. 7, a detached edge view thereof; Fig. 8, a sectional view of a single bell constructed in accordance with my invention; Fig. 9, a broken view of another modified form which my improved bell may assume, this form of the bell being operated by a plunger instead of by a pivotal lever and being particularly designed for use as an automobile-bell.

My invention relates to an improvement in bicycle-bells, the object being to produce a comparatively simple, compact, durable, and convenient bell constructed with particular reference to the production of a clear, loud, characteristic, and penetrating alarm.

With these ends in view my invention consists in a bell having certain details of construction and combinations of parts, as will be hereinafter described, and recited in the claims.

In Figs. 1 to 7, inclusive, I have shown the application of my invention to the production of a double bicycle-bell, though the invention is clearly applicable to the production of single bells, to automobile-bells, and to bells designed to be used in kindred situations. As shown in the said figures of the drawings, the bell is provided with two loose balance-wheels 2 2$^a$, each formed upon its edge with a heavy bead-like rim 3, the circle of which is broken to form an opening 3$^a$ for the reception of a disk-like striker 4, formed with an eccentrically-arranged circular opening 5, receiving a retaining-pin 6, mounted in the wheel, and enough smaller in diameter than the diameter of the said opening to give the striker considerable range of movement, in which it is restrained by a spiral spring 7, encircling the outer end of the said pin 6 and at one end bearing upon the head thereof and at the other end bearing upon a vulcanized fiber washer 8, resting upon the outer face of the striker. Each striker is kept from undue vibratory movement by forming it with a notch 4$^a$, receiving a finger 4$^b$, lifted from the body of the wheel to enter the said notch and perform a restraining function. These strikers are counterbalanced by forming the balance-wheels with weights 9, located opposite their openings 3$^a$. When the balance-wheels are rotated, the strikers are thrown out by centrifugal action and impinge against the inner surface of gongs 10 and 11, corresponding to each other in size and contour, but preferably differentiated in tone. The said gongs are respectively screwed upon the oppositely-threaded outer ends of two studs 12, formed integral with a hub 13, firmly secured within an opening 14, passing centrally through a disk-like skeleton frame 15, which constitutes the body of the bell and which is provided with a standard 16, the feet 17 of which are perforated and threaded for the reception of the threaded ends of the clamping-screws 18, which pass through the ends of a bowed clip 19, which provides for clamping the bell upon the handle-bar of a bicycle. The said balance-wheels are located on the opposite sides of the frame 15 and loosely mounted upon the smooth or unthreaded inner portions of the studs 12, on which they are designed to have unrestrained rotation after having an initial rotatory impulse imparted to them, as will be described later on. For the mounting of the said balance-wheels they are provided with bushings 20, the projecting outer ends of which are engaged by nuts 21, which prevent the wheels from outward displacement upon the studs 12. The inner ends of the said bushings terminate in pinions 22, which are held away from the inner faces of the balance-wheels by means of washers 23, interposed between the outer faces of the pinions and the inner faces of the wheels, whereby, so to speak, the inner faces of the wheels are built out somewhat. The said pinions 22 of the balance-wheels 2 and $2^a$ are respectively meshed into by loose gear-wheels 24 and 25, mounted so as to turn freely upon the ends of a short driving-shaft 26, journaled so as to turn in the bearing 27, formed for it in the frame or body 15. For the purpose of coupling these loose gear-wheels with the shaft 26 they are provided with pawls 28, having pawl-springs 29 and engaging with ratchet-wheels 30, rigidly secured to the ends of the shaft 26, which is itself rotated positively in either direction by its provision with a pinion 31, meshed into by the segmental rack 32 of an operating-lever 33, hung upon a pivot 34, mounted in the frame 15 and provided with a projecting finger-piece 35. A spiral spring 36, one end of which is attached to the lever and the other to the frame 15, provides for restoring the lever to its normal position. The pawls 28 are so placed with reference to the ratchet-wheels 30 that when the finger-piece 35 of the lever 33 is depressed against the tension of the spring 36 and the segmental rack 32 is lifted the shaft 26 will be rotated, and with it the ratchet-wheels 30, which will be forced against the noses of the pawls 28, whereby the loose gear-wheels 25 will be positively rotated and their motion transmitted to the balance-wheels 2 and $2^a$, which will be started in rotation with a rapidity proportional to the power and quickness with which the lever 33 is operated. The said balance-wheels continue to rotate long after the lever has finished its upward stroke, because their rotation in the direction in which they are started rotating in the manner described is unrestrained and unhampered except by the loose gear-wheels 24 and 25, which they now rotate idly in the direction in which the said wheels were started rotating, the pawls of the said wheels easily riding over the teeth of the ratchet-wheels 30. When pressure upon the finger-piece 35 is relieved, the spring 36 reasserts itself and pulls the operating-lever 33 back into its normal position, causing the rack 32 to positively rotate the shaft 26 in the opposite direction from what it rotated during the operative movement of the lever; but this movement of the shaft does not influence the gear-wheels, because its ratchet-wheels 30 merely turn under the pawls 28, which ride over their teeth.

It will be understood from the foregoing that by a single operation of the lever both balance-wheels may be actuated in very rapid rotation, with the effect of striking the gongs with great rapidity and sounding a loud alarm continued long after the rider has removed his finger from the bell. By repeating the movement of the operating-lever the balance-wheels may be kept in constant rotation and the gong continuously sounded. The pawls 28 and ratchet-wheels 30 constitute, as thus appears, coupling means between the operating-lever 33 and the balance-wheels 2 and $2^a$, whereby the power applied to the lever is transmitted to the wheels, which, however, are still free to rotate practically unhampered.

The single bell (shown by Fig. 8 of the drawings) is the same in principle as the double bell described and does not need description more than to say that it is furnished with a single balance-wheel 37, mounted upon a stud 38, which is threaded for the attachment of the gong 39. The stud in this case is riveted into a cup-shaped base 40, corresponding to the frame 15 of the construction previously described, the stud being also utilized to secure one part of the clip 41 to the base. The balance-wheel 37 is furnished with a pinion 42, meshed into by a loose gear-wheel 43, carrying a spring-actuated pawl 44, engaging with a ratchet-wheel 45, turning with a pinion 46, loosely mounted upon a stud 47 and meshed into by the segmental rack 48 of an operating-lever 49, mounted upon a stud 50 and furnished with a projecting finger-piece 51. The operation of this device, so far as it consists in imparting an initial impulse to a balance-wheel by means of an operating-lever is concerned, is the same as the device already described.

In the modification shown by Fig. 9 of the drawings, the lever is replaced by a plunger 52, provided at its upper end with a knob 53, adapted to be operated by the foot and having a spring 54 connected with it. This plunger is formed with a rack 55, meshing into a pinion 56, secured to a shaft 57, corresponding to the shaft 26 of the device shown in Figs. 1 to 7, inclusive, and employed for actuating loose gear-wheels meshing into balance-wheels initially started by the plunger 52 and rotating independently thereof until their inertia has spent itself.

In view of the modifications shown and described and of others which may obviously be made I would have it understood that I do not limit myself to the construction shown and described, but hold myself at liberty to make such changes as fairly fall within the spirit and scope of my invention.

Having fully described my invention, what I claim as new, and desire to secure by Letters Patent, is—

1. In a bicycle-bell, the combination with a gong, of a striker, a loosely-mounted balance-wheel by which the striker is carried, and means for imparting an initial rotatory impulse to the balance-wheel, including a coupling device which permits the balance-wheel to continue to rotate independently of the said means after it has once been started rotating.

2. In a bell, the combination with a gong, of a striker, a loosely-mounted balance-wheel upon which the striker is mounted, a pinion carried by the balance-wheel, a loose gear-wheel meshing into the said pinion, a ratchet-wheel, a pawl carried by the loose gear-wheel and coacting with the said ratchet-wheel, and means for positively rotating the ratchet-wheel, whereby its rotatory movement is communicated through the pawl to the gear-wheel, and hence to the balance-wheel, which, when once started in rotation, keeps on rotating until its inertia is spent.

3. In a bicycle-bell, the combination with a gong, of a striker, a loosely-mounted balance-wheel carrying the said striker, a pinion carried by the said balance-wheel, a loose gear-wheel meshed into the said pinion, a ratchet-wheel, a pawl for coupling the said gear-wheel and the ratchet-wheel together, a shaft upon which the ratchet-wheel is mounted, a pinion carried by the said shaft, and a rack meshing into the said pinion last mentioned.

4. In a bicycle-bell, the combination with a central frame or body, of two studs connected therewith, gongs applied to the said studs, balance-wheels loosely mounted on the respective studs on opposite sides of the said frame, an operating-lever connected with the frame, and operating mechanism between the said lever and balance-wheels, whereby they are given an initial rotatory impulse and then uncoupled from the said operating-lever and left free to spend their initial rotatory impulse.

In testimony whereof I have signed this specification in the presence of two subscribing witnesses.

NORMAN N. HILL.

Witnesses:
MAUDE E. BARTON,
MAUDE A. CLARK.